United States Patent
Noirie et al.

(10) Patent No.: US 6,782,156 B2
(45) Date of Patent: Aug. 24, 2004

(54) INTERLEAVED BAND DEMULTIPLEXING/MULTIPLEXING SYSTEM

(75) Inventors: Ludovic Noirie, Bagneux (FR); Jean-Paul Faure, Paris (FR)

(73) Assignee: Alcatel, Paris (FR)

(*) Notice: Subject to any disclaimer, the term of this patent is extended or adjusted under 35 U.S.C. 154(b) by 186 days.

(21) Appl. No.: 09/993,680

(22) Filed: Nov. 27, 2001

(65) Prior Publication Data

US 2002/0071631 A1 Jun. 13, 2002

(30) Foreign Application Priority Data

Dec. 7, 2000 (FR) .............................................. 00 15887

(51) Int. Cl.[7] .......................... G02B 6/293; H04I 14/02
(52) U.S. Cl. ............................ 385/24; 385/37; 398/82; 398/83; 398/84; 398/85; 398/87
(58) Field of Search ................................ 385/24, 30, 31, 385/37, 49; 398/82–88

(56) References Cited

U.S. PATENT DOCUMENTS 5,748,350 A * 5/1998 Pan et al. ..................... 398/87

5,852,505 A 12/1998 Li

FOREIGN PATENT DOCUMENTS

EP          1 043 859 A2    10/2000
EP          1043859 A2 *    10/2000  ............ H04J/14/02

OTHER PUBLICATIONS

Harada K et al.: "Hierarchical optical path cross–connect systems for large scale WDM networks" OFC/IOOC '99. Optical Fiber Communication Conference and the International Conference on Integrated Optics and Optical Fiber Communications (Cat. No. 99CH36322), OFC/IOOC '99. Optical Fiber Communication Conference and the International Conference On IN, pp. 356–358 vol. 2.

* cited by examiner

Primary Examiner—Hemang Sanghavi
Assistant Examiner—Omar Rojas
(74) Attorney, Agent, or Firm—Sughrue Mion, PLLC

(57) ABSTRACT

An optical demultiplexing system demultiplexes a multiplex which has at least three levels of granularity and includes m interleaved bands of wavelengths each of which includes p wavelengths. The system includes a 1-to-m deinterleaving demultiplexer for demultiplexing the multiplex into m bands of wavelengths and a 1-to-p deinterleaving demultiplexer for demultiplexing each of the m bands into p wavelengths. The numbers m and p are mutually prime.

8 Claims, 4 Drawing Sheets

INTERLEAVED BAND DEMULTIPLEXING/ MULTIPLEXING SYSTEM

CROSS-REFERENCE TO RELATED APPLICATIONS

This application is based on French Patent Application No. 00 15 887 filed Dec. 7, 2000, the disclosure of which is hereby incorporated by reference thereto in its entirety, and the priority of which is hereby claimed under 35 U.S.C. §119.

BACKGROUND OF THE INVENTION

1. Field of the Invention

The invention relates to wavelength division multiplex fiber optic transmission systems and more precisely to cross-connecting or switching wavelengths in them.

2. Description of the Prior Art

The context of the present invention is that of optical switches, or cross-connect units, having a multigranularity architecture. The granularity concept reflects the data transmission capacity of the optical network. To switch the total traffic at the level of a switch, this type of architecture therefore takes account of different data transmission capacity levels. For example, one portion of the total traffic may be switched at the fiber level, which corresponds to a high level of granularity, another portion may be switched at the band of wavelengths level, which corresponds to an intermediate level of granularity, and a final portion may be switched at the wavelength level, which corresponds to a low level of granularity. Supplementary levels of granularity can also be taken into account.

Transmission capacity in fiber optic systems is increasing all the time, because the number of channels transmitted by wavelength division multiplexing in each fiber is increasing and the number of fibers per cable is increasing. This gives rise to the problem of routing and cross-connecting channels in switching devices and, to be more specific, the problem of the complexity of switching devices liable to be required to route an increasing number of channels.

K. Harada et al, "Hierarchical optical path cross-connect systems for large scale WDM networks", proposes an optical cross-connection architecture corresponding to a hierarchical optical path structure with two layers. The paper proposes grouping adjacent wavelengths to form bands and switching the bands. This solution limits the number of wavelength converters used in each optical cross-connect unit.

FIG. 1 shows the principle of demultiplexing adjacent bands.

In the FIG. 1 example, the fiber consists of 12 channels or wavelengths $\lambda 1$ to $\lambda 12$. Each band consists of four adjacent channels. The fiber is therefore demultiplexed into three bands each of four adjacent channels by means of a fiber to band demultiplexer Demux F→B. Each band is then demultiplexed into wavelengths by means of a band to wavelength demultiplexer Demux' B→W. A band switch BXC is disposed between the band stage and the wavelength stage, immediately ahead of the band to wavelength demultiplexers Demux' B→W.

In the FIG. 1 example, the signal from the fiber is therefore filtered to separate the adjacent bands.

Accordingly, the demultiplexer Demux F→B used for fiber to band demultiplexing is an adjacent band demultiplexer. This kind of multiplexer uses filtering with a wide pass band and the transfer function FTb shown diagrammatically in FIG. 1. The filtering applied by the adjacent band demultiplexer Demux F→B isolates all of the channels of the same band. A first band therefore consists of four adjacent wavelengths $\lambda 1$ to $\lambda 4$, a second band consists of adjacent wavelengths $\lambda 5$ to $\lambda 8$, and a third band consists of adjacent wavelengths $\lambda 9$ to $\lambda 12$.

For band to wavelength demultiplexing, each band, after routing in the band switch BXC, is demultiplexed into four channels via the band to wavelength demultiplexer Demux' B→W. Each demultiplexer Demux' B→W used is a 1-to-4 deinterleaving demultiplexer. This kind of deinterleaving demultiplexer uses periodic filtering whose transfer function FTc' is shown diagrammatically in FIG. 1, based on Mach-Zehnder filters or on array waveguide gratings (AWG). The channel filtering applied by the deinterleaving demultiplexer Demux' B→W is therefore periodic filtering to isolate one channel in the band.

Accordingly, to obtain the wavelengths, it is necessary to use deinterleaving demultiplexers, i.e. demultiplexers in which filtering is effected by periodic filters of the type described above.

In the case of multigranularity optical cross-connection architectures, because of the presence of switching stages such as the band switch BXC, it is not possible to know a priori the adjacent band that will be demultiplexed at the input of each band to wavelength demultiplexer. A deinterleaving demultiplexer, in which the filtering is periodic, takes account of all the adjacent bands. This kind of demultiplexer does not depend on the band at the input. Thus all wavelengths can be demultiplexed.

Another way to cross-connect wavelengths in wavelength division multiplex fiber optic transmission systems is to define interleaved bands rather than adjacent bands. The French patent document whose title in translation is "AN INTERLEAVED BAND OPTICAL CROSS-CONNECTION SYSTEM" therefore proposes, for cross-connecting optical transmission channels, grouping the various channels or the various wavelengths into interleaved bands. In this case, the bands are formed of wavelengths or channels that are not adjacent.

FIG. 2 shows the principle of demultiplexing when interleaved bands are used. The fiber consists of 12 wavelengths $\lambda 1$ to $\lambda 12$. Three bands each of four channels are obtained by means of a fiber to band demultiplexer Demux' F→B.

Thus the fiber is demultiplexed into three bands which are interleaved, i.e. one channel of one band is adjacent channels of other bands. Accordingly, a first band consists of the wavelengths $\lambda 1$, $\lambda 4$, $\lambda 7$ and $\lambda 10$, a second band consists of the wavelengths $\lambda 2$, $\lambda 5$, $\lambda 8$ and $\lambda 11$, and, finally, a third band consists of the wavelengths $\lambda 3$, $\lambda 6$, $\lambda 9$ and $\lambda 12$. The channels of the same band are separated by a constant spectral gap.

Each band is then demultiplexed into wavelengths by means of a band to wavelength demultiplexer Demux BOW. Before being demultiplexed, the bands are switched in a band switch BXC.

For the fiber to band demultiplexing, the fiber is demultiplexed into three interleaved bands by the fiber to band demultiplexer Demux' F→B. The demultiplexer Demux' F→B used is a 1-to-3 deinterleaving demultiplexer. This kind of demultiplexer uses periodic filtering, based on Mach-Zehnder filters or array waveguide gratings, whose transfer function FTb' is shown diagrammatically in FIG. 2 and which isolates all the channels of the same band.

For band to wavelength demultiplexing, each band of wavelengths is demultiplexed into four channels by the band to wavelength demultiplexer Demux B→W. Each demultiplexer Demux B→W used is an adjacent band demultiplexer, i.e. a demultiplexer that uses filtering with a wide pass band. The transfer function FTc of this kind of channel filter is shown diagrammatically in FIG. 2.

To obtain the wavelengths, it is necessary to use adjacent band demultiplexers Demux B→W because, as explained above, due to the presence of the band switch stage BXC, it is not possible to know a priori the interleaved band that will be demultiplexed. This is why all the wavelengths are demultiplexed using adjacent band demultiplexers with a wide pass band, regardless of the interleaved band at the input.

However, the teaching of each of the above prior art documents is unsatisfactory. The two prior art systems, one with adjacent bands and the other with interleaved bands, in fact require the same demultiplexing devices.

In particular, where the system with adjacent bands is concerned, to go from fibers to wavelengths it is first necessary to use an adjacent band demultiplexer Demux F→B to obtain the adjacent bands and then deinterleaving demultiplexers Demux' B→W to obtain the wavelengths. Where the system with interleaved bands is concerned, to go from fibers to wavelengths, it is first necessary to use a deinterleaving demultiplexer Demux' F→B to obtain the interleaved bands and then an adjacent band demultiplexer Demux B→W to obtain the wavelengths.

Using an adjacent band demultiplexer in which filtering is effected by a filter with a wide pass band leads to major problems in terms of filtering quality. In particular, it is difficult to obtain a filter of this kind that does not lose wavelengths between two successive bands.

The problem to be addressed is that of the ratio between the pass band and the rejection band of the filter. The pass band corresponds to the whole of the spectrum that is passed without being attenuated by more than a predefined number of decibels (dB), for example 0.5 dB or 3 dB. The rejection band corresponds to a spectral gap outside which the signal is attenuated by at least a predefined number of decibels (dB), typically 20 dB or 25 dB. The wavelengths that are between the pass band and the rejection band cannot be used as they are too attenuated to be used on the channel concerned of the band demultiplexer and not sufficiently attenuated to be used on other channels of the band demultiplexer. They are therefore "lost" wavelengths.

The object is to obtain a ratio close to one, to lose the fewest wavelengths. To obtain a pass band to rejection band ratio close to one, the filter rising and falling edges must be steep, i.e. the shape of the filter must be perfectly rectangular. This kind of filter is technologically very difficult to make.

FIG. 3 illustrates this problem relating to the use of adjacent band demultiplexers and shows fiber to adjacent band demultiplexing. An adjacent band demultiplexer is therefore used, with filtering with a wide pass band.

The top part A of FIG. 3 shows an ideal filter with a perfectly rectangular shape. Part B shows the real shape of the filter. The rectangular filter shape is highly imperfect. Consequently, wavelengths at the edges of the band, normally taken into account in ideal filtering, are lost and cannot be used. The lost wavelengths are crossed through in FIG. 3.

Thus using a filter with a wide pass band leads to loss of wavelengths.

Also, the problem that the invention intends to solve is that of efficiently demultiplexing n different optical granularities, where n is at least equal to 3, avoiding the drawbacks of the prior art explained above, i.e. without losing wavelengths.

To this end, the invention proposes to use interleaved bands and to use only deinterleaving demultiplexers, i.e. demultiplexers in which the filtering is periodic. In accordance with the invention, these demultiplexers are used both for fiber to band demultiplexing and for band to wavelength demultiplexing.

The system according to the invention also applies to wavelength to band multiplexing and band to fiber multiplexing. To this end interleaving multiplexers are used in the system.

SUMMARY OF THE INVENTION

The invention therefore provides an optical demultiplexing system for demultiplexing a multiplex which has at least three levels of granularity and includes m interleaved bands of wavelengths each of which includes p wavelengths, which system includes a 1-to-m deinterleaving demultiplexer for demultiplexing the multiplex into m bands of wavelengths and a 1-to-p deinterleaving demultiplexer for demultiplexing each of the m bands of wavelengths into p wavelengths, and in which system the numbers m and p are mutually prime.

The invention also provides an optical multiplexing system for obtaining a multiplex which has at least three levels of granularity and includes m interleaved bands of wavelengths each of which includes p wavelengths, which system includes m p-to-1 interleaving multiplexers, each for multiplexing p wavelengths into a band of wavelengths, and an m-to-1 interleaving multiplexer for multiplexing the m bands of wavelengths into a fiber, and in which system the numbers m and p are mutually prime.

Other features and advantages of the invention will become more clearly apparent on reading the following description of one particular embodiment, which description is given with reference to the accompanying drawings.

DETAILED DESCRIPTION OF THE PREFERRED EMBODIMENT

Figure 1:
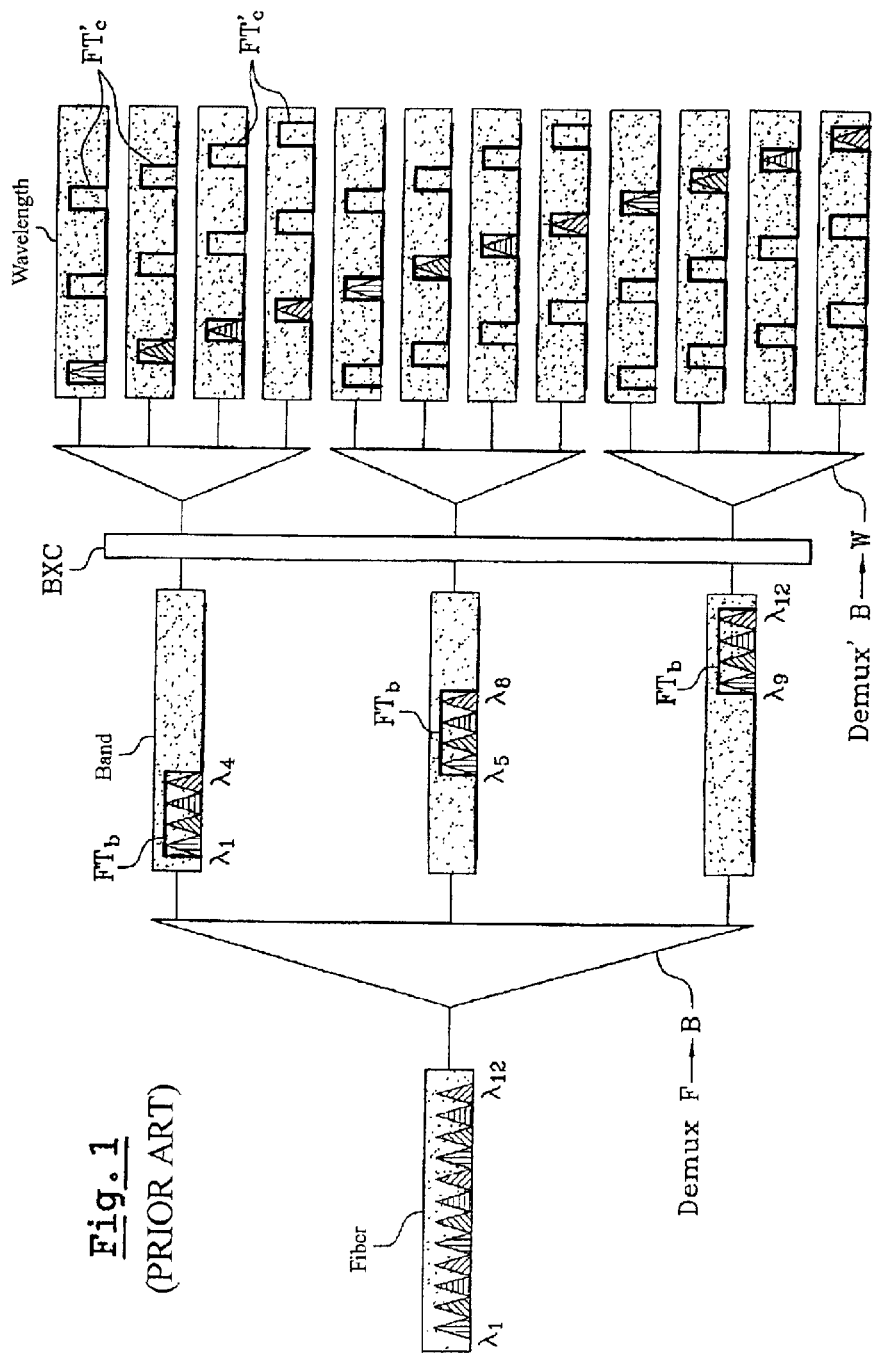
FIG. 1 is a diagram showing fiber to band and band to wavelength demultiplexing, with adjacent bands, as in the prior art, as described in the above preamble.
Figure 2:
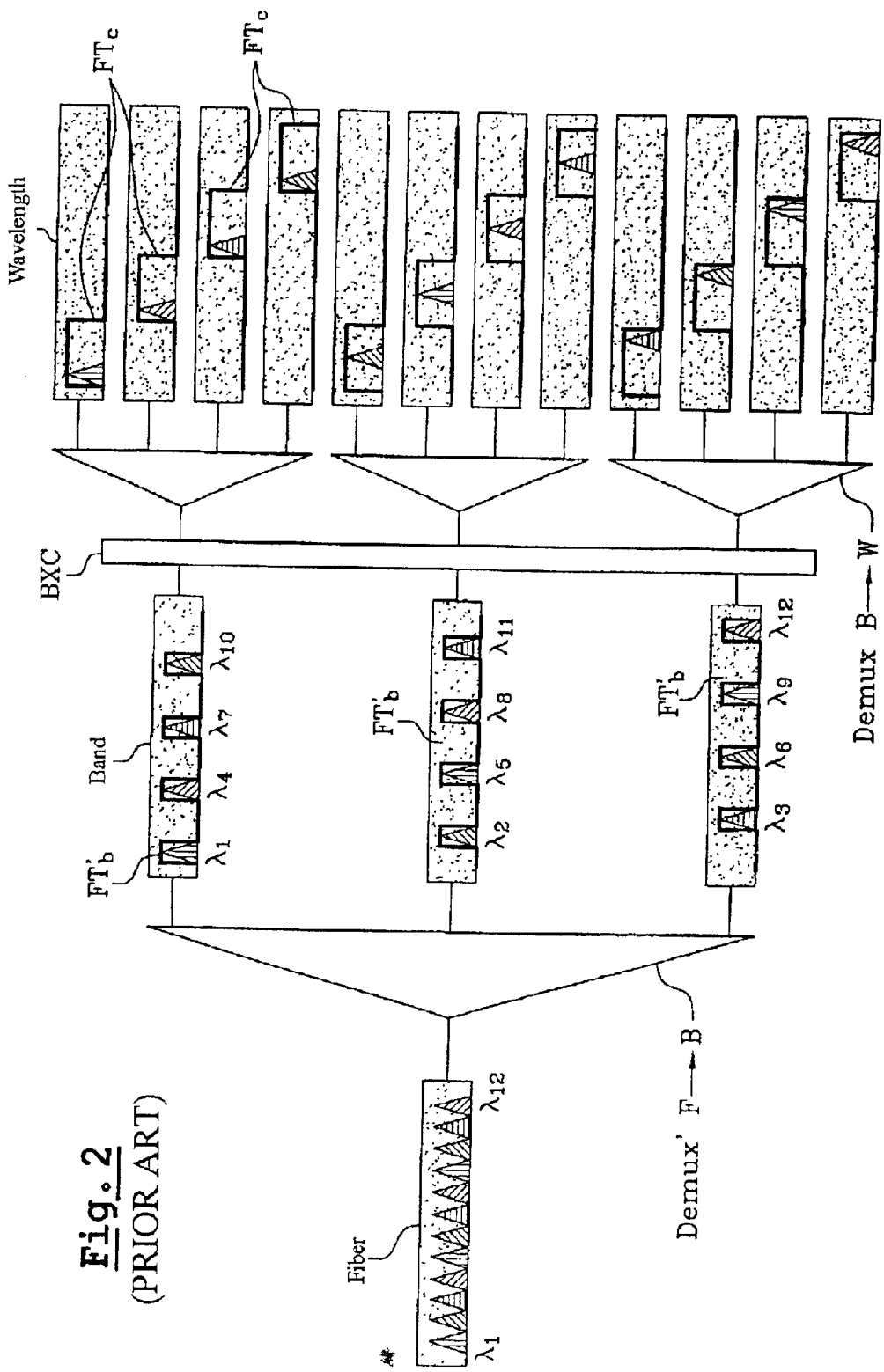
FIG. 2 is a diagram showing fiber to band and band to wavelength demultiplexing using interleaved bands, as in the prior art, as described in the above preamble.
Figure 3:
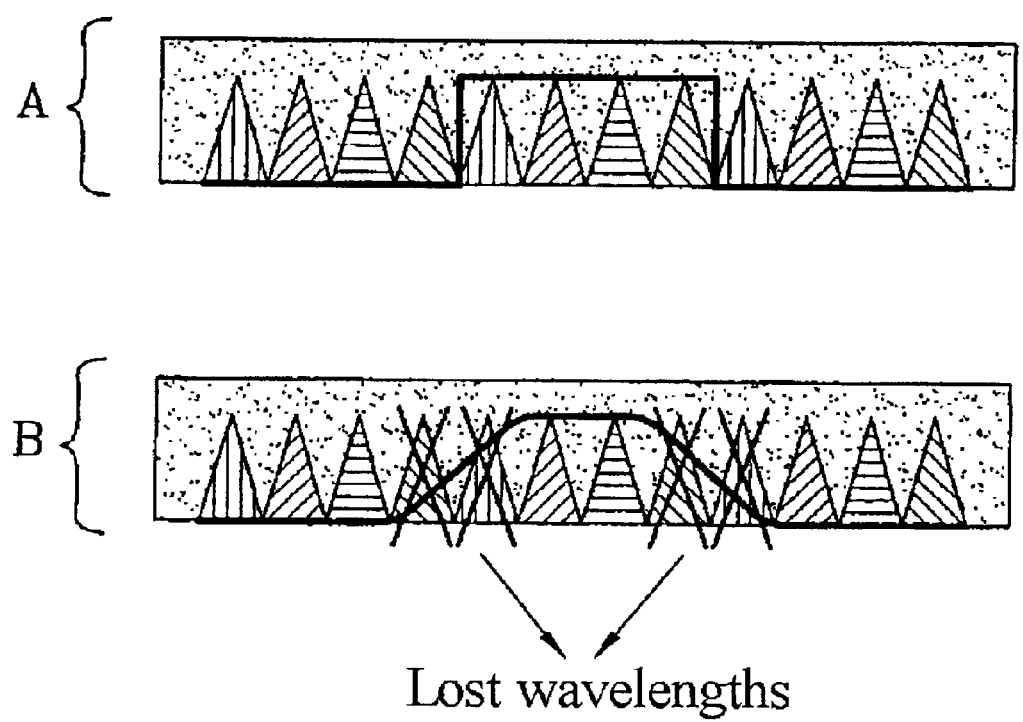
FIG. 3 is a diagram showing problems due to the use of an adjacent band demultiplexer, as described in the above preamble.
Figure 4:
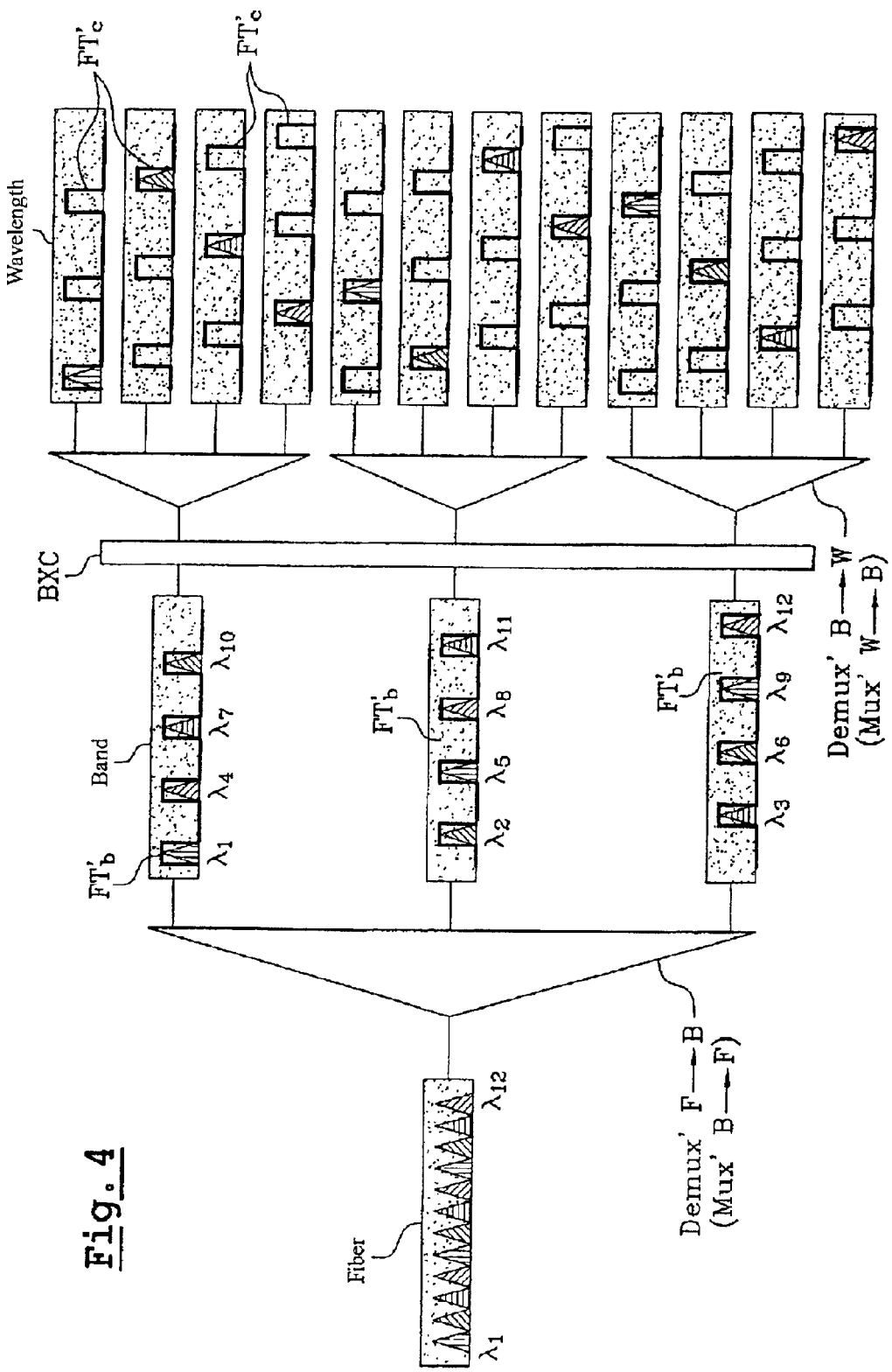
FIG. 4 is a diagram showing a demultiplexing system in accordance with the invention, when read from left to right, or a multiplexing system in accordance with the present invention, when read from right to left.

Thus FIG. 4 shows one example of the operation of a system according to the invention. The fiber contains 12 wavelengths $\lambda 1$ to $\lambda 12$. The fiber stage is followed by a stage made up of three bands, which is separated from the preceding stage by a fiber to band demultiplexer Demux' F→B. Thus the fiber is demultiplexed into three bands. Those bands are interleaved, i.e. a channel of one band is adjacent to channels of other bands.

The band stage is followed by a wavelength stage. A band switching stage BXC is disposed between the two stages.

Each band is demultiplexed into wavelengths by a band to wavelength demultiplexer Demux' B→W.

A 1-to-3 deinterleaving demultiplexer Demux' F→B demultiplexes the fiber into three interleaved bands. The deinterleaving demultiplexer Demux' F→B uses band filtering based on Mach-Zehnder filters or array waveguide gratings, whose periodic transfer function FTb' is shown diagrammatically. In each period of the filter, a wavelength is selected to constitute the band.

The fiber is thus demultiplexed into three bands each of four channels and a channel of one band is adjacent channels of other bands. Thus a first band consists of wavelengths $\lambda 1$, $\lambda 4$, $\lambda 7$ and $\lambda 10$, a second band consists of wavelengths $\lambda 2$, $\lambda 5$, $\lambda 8$ and $\lambda 11$, and, finally, a third band consists of wavelengths $\lambda 3$, $\lambda 6$, $\lambda 9$ and $\lambda 12$. The channels of the same band are separated by a constant spectral gap corresponding to the period of the filter used by the deinterleaving demultiplexer Demux' F→B.

To obtain the wavelengths, the bands are then each demultiplexed into four channels by a band to wavelength demultiplexer Demux' B→W. Each demultiplexer Demux' B→W used is a 1-to-4 deinterleaving demultiplexer. A deinterleaving demultiplexer of this kind uses channel filtering whose periodic transfer function FTc' is shown diagrammatically and which is based on Mach-Zehnder filters or array waveguide gratings.

The channel filtering can be effected only if the number of bands (i.e. three in the FIG. 4 example) and the number of wavelengths per band (i.e. four in the FIG. 4 example) are mutually prime. If this were not the case, using deinterleaving demultiplexers to filter, on the one hand, the bands and, on the other hand, the channels would not recover all the wavelengths.

To generalize, let N be the total number of wavelengths in a fiber, p the number of wavelengths per band and m the number of bands in a fiber. A 1-to-m deinterleaving demultiplexer is used to demultiplex a fiber into m bands and a 1-to-p deinterleaving demultiplexer is used to demultiplex a band in p wavelengths. It is important to note that the numbers m and p must be mutually prime. If not, it is impossible to demultiplex the wavelengths.

Thanks to this use of double periodic filtering by the deinterleaving demultiplexers Demux' F→B and Demux' B→W, the first to filter bands and the second to filter wavelengths, all the wavelengths constituting the input multiplex are demultiplexed with no risk of losing any wavelength during processing.

The rejection problem that is encountered with filters with a wide pass band such as those used in adjacent band demultiplexers does not arise with the periodic filters of the invention. For these filters, it is not necessary to have a pass band to rejection band ratio close to one. A ratio of the order of 0.5 is sufficient. Over one period, a periodic filter selects only one wavelength. Thus even if the actual shape of the filter is not perfectly rectangular, this does not compromise the quality of filtering.

Also, the periodic filters that the invention proposes to use for band filtering and for wavelength filtering are simple to implement and relatively inexpensive.

For multiplexing, FIG. 4 must be read from right to left and the labels Demux' B→W and Demux' F→B respectively replaced with the labels Mux' W→B and Mux' B→F.

Thus the twelve wavelengths $\lambda 1$ to $\lambda 12$ are multiplexed into three bands by the wavelength to band multiplexers Mux' W→B. Each multiplexer Mux' W→B receives four wavelengths at its input and supplies an interleaved band at its output addressed to the band switching stage BXC. The multiplexers Mux' W→B used are 4-to-1 interleaving multiplexers.

The three bands obtained, each consisting of four interleaved channels, are in turn multiplexed by a band to fiber multiplexer Mux' B→F. The band to fiber multiplexer Mux' B→F is a 3-to-1 interleaving multiplexer. A complete multiplex consisting of the wavelengths $\lambda 1$ to $\lambda 12$ is obtained at the output of the interleaving multiplexer Mux' B→F.

To generalize, as previously, let N be the total number of wavelengths in a fiber, p the number of wavelengths per band and m the number of bands in a fiber; thus there are m groups of p wavelengths and N=m×p. To multiplex p wavelengths into a band, a p-to-1 interleaving multiplexer is used, and to multiplex m interleaved bands of wavelengths into a fiber, an m-to-1 interleaving multiplexer is used. It is important to note that the numbers m and p must be mutually prime. If they are not, it is not possible to multiplex all the wavelengths satisfactorily.

There is claimed:

1. An optical demultiplexing system for demultiplexing a multiplexed signal that has at least three levels of granularity and consists of m interleaved bands of wavelengths, each interleaved band consists of p wavelengths, said system includes a 1-to-m deinterleaving demultiplexer for demultiplexing said multiplexed signal into m bands of wavelengths and a 1-to-p deinterleaving demultiplexer having a periodic transfer function for demultiplexing each of said m bands of wavelengths into p wavelengths, and in which said numbers m and p must be mutually prime.

2. The system claimed in claim 1 wherein said 1-to-m deinterleaving demultiplexer uses interleaved band filtering with a periodic transfer function.

3. The system claimed in claim 2 wherein said interleaved band filtering is based on Mach-Zehnder filters or on array waveguide gratings.

4. The system claimed in claim 1 wherein said 1-to-p deinterleaving demultiplexer uses channel filtering.

5. The system claimed in claim 4 wherein said channel filtering is based on Mach-Zehnder filters or array waveguide gratings.

6. An optical multiplexing system for obtaining a multiplexed signal that has at least three levels of granularity and consists of m interleaved bands of wavelengths, each interleaved band consists of p wavelengths, said system includes m p-to-1 interleaving multiplexers having a periodic transfer function, each multiplexing p wavelengths into a band of wavelengths, and a m-to-1 interleaving multiplexer for multiplexing said m bands of wavelengths into a fiber, and in which said numbers m and p must be mutually prime.

7. The system claimed in claim 2 wherein said interleaved band filtering has a pass band to rejection band ratio of approximately 0.5.

8. The system claimed in claim 4 wherein said channel filtering has a pass band to rejection band ratio of approximately 0.5.

* * * * *